UNITED STATES PATENT OFFICE.

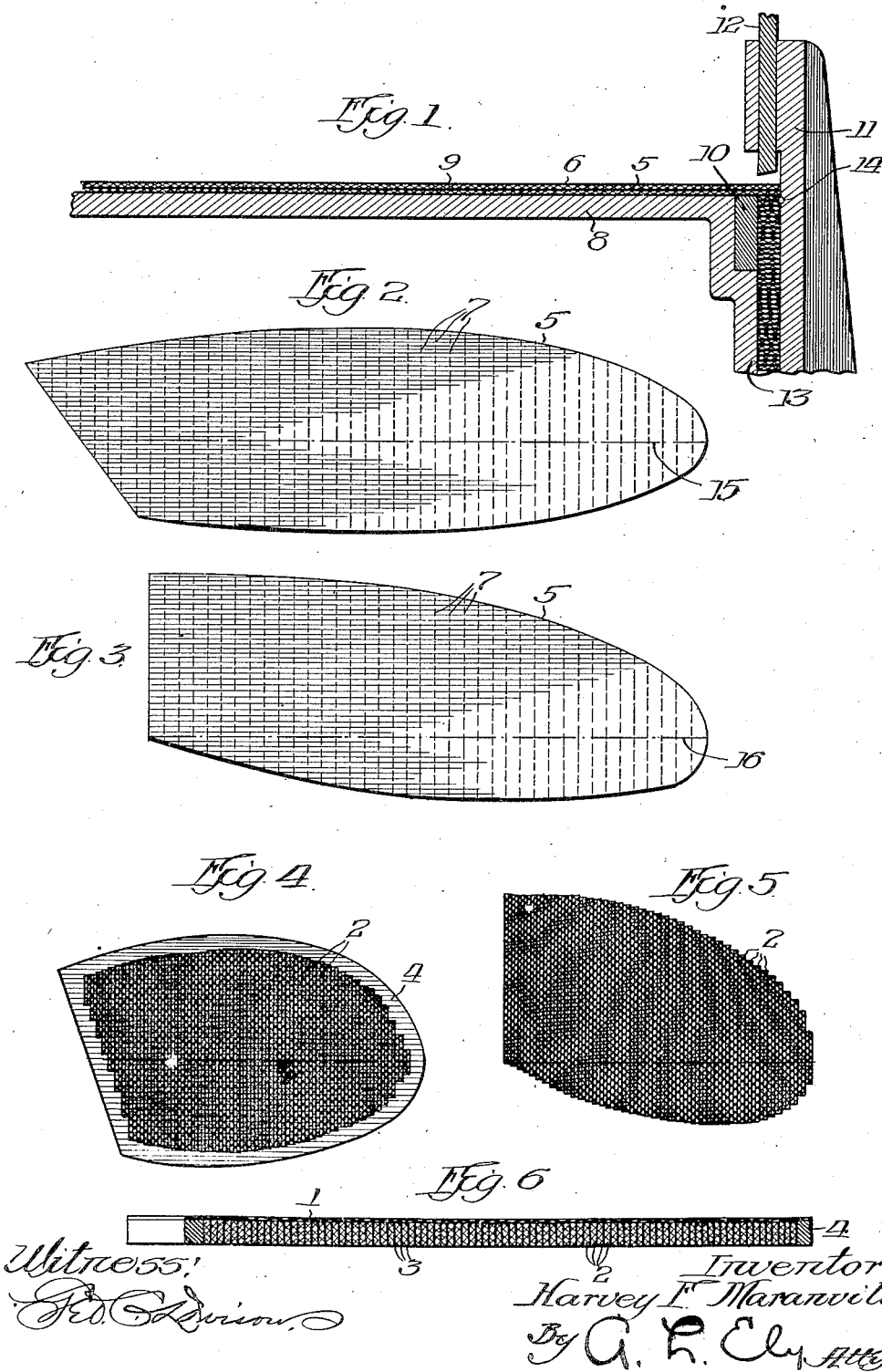

HARVEY F. MARANVILLE, OF AKRON, OHIO, ASSIGNOR TO THE FIRESTONE TIRE AND RUBBER COMPANY, OF AKRON, OHIO, A CORPORATION OF OHIO.

METHOD FOR MAKING ARTICLES OF FABRIC AND RUBBER.

1,382,208. Specification of Letters Patent. Patented June 21, 1921.

Application filed February 24, 1919. Serial No. 279,025.

*To all whom it may concern:*

Be it known that I, HARVEY F. MARANVILLE, a citizen of the United States, residing at Akron, in the county of Summit and State of Ohio, have invented certain new and useful Improvements in Methods for Making Articles of Fabric and Rubber, of which the following is a specification.

The invention relates to a method of manufacturing articles which are composed of layers or strips of fabric and rubber placed on end, which are surrounded by a band of rubber and backed by a layer of canvas, all vulcanized together. The advantage of a structure of this type is obvious, as the ends of the threads or fibers in the fabric are presented to the wearing surface and the article possesses great wearing properties.

The particular use which is shown in this application, is for the manufacture of shoe soles, although the intervention is not restricted to such use.

It has heretofore been proposed to manufacture these articles in a variety of ways, but they have all been open to objection as expensive and wasteful of material. By the method herein described, it is possible to manufacture shoe soles or other articles rapidly and efficiently and with a minimum amount of waste.

The method of manufacturing articles of rubber and fabric of the character described, is shown in the accompanying drawings, being applied to shoe soles in the particular instances there illustrated.

Figure 1 is a view showing a type of apparatus to carry out the method.

Fig. 2 is a view showing a sole blank as laid out for practising the invention.

Fig. 3 is a modified form of sole blank.

Fig. 4 is a plan view of a completed sole made in accordance with Fig. 2.

Fig. 5 is a view of a sole made in accordance with the showing in Fig. 4, the outer rim of rubber being omitted.

Fig. 6 is a longitudinal section through a finished sole.

In the drawings, the finished sole is illustrated in Fig. 6, 1 being the backing of rubberized fabric to which is anchored by vulcanization a plurality of strips of fabric 2 set on end so that the fabric is normal to the ground. The several strips of fabric are spaced apart and united by layers of rubber 3. After the rubberized fabric is assembled, it is surrounded and incased by a rim or border of rubber 4 which serves to hold the edges of the fabric together and presents a neat appearance on the side of the sole.

The problem of assembling the strips 2 with the layers of rubber 4 has been solved by me in a novel and economical manner. In accordance with my improved method, I lay out a blank of rubberized skim coated fabric, in one, two, or more layers shown at 5, the rubber coating 6 being of sufficient thickness to form the intermediate layers 3 of rubber in the finished sole. I lay this out in accordance with a pattern which will be of the form and dimensions as though the strips of fabric 3 were laid out flat and edge to edge. The dotted lines 7 in Fig. 2 show the lines on which the subsequent cuts are to be made. By laying out the blanks in this manner, it is possible to economically cut them from sheets of rubberized fabric. The blank is cut into strips along the parallel lines 7, and the severed strips are stacked on top of one another at right angles to the blank until the whole blank is cut and the pieces piled one on top of the other, thus being assembled in the form of the finished sole, positioned perpendicular to the original blank.

A convenient apparatus for cutting and assembling the strips is shown in Fig. 1. 8 represents a table on which the blank 9 is placed, the forward end of the table having a knife block 10. Back of the blade 10 is arranged a stock plate or wall 11 at a sufficient distance to make the proper cut. A suitable form of knife 12 is arranged above the table and is operated to coact with the blade 10. Below the cutting point is arranged a throat or channel 13 in which the severed pieces of fabric and rubber are stacked in a column, or pile, which is movable through the throat. A wire 14, or similar formation is located in the throat 13 and keeps the severed pieces in horizontal position preventing them from turning on edge.

As the several strips are cut off from the front end of blank, they are forced down in the throat 13 by the knife 12 and are stacked up in the manner shown against the frictional resistance of the throat, the assembled mass in the form of a sole passing out at the lower end of the throat, ready to receive the backing canvas 1 and the rubber border 4.

In the form shown in Fig. 2, the sole blank is fed in the direction of the line 15 and it will be noted that as a result the ends of the fabric pieces at the rear edge or arch of the sole come in a stepped arrangement, shown in Fig. 4 which greatly assists in locking the border of rubber on the sole.

In certain cases it may not be desirable to form the fabric portion of the sole without the stepped arrangement at the arch and for this purpose the blank may be formed as shown in Fig. 3, the line of feed being as shown at 16 and the resultant sole being shown in Fig. 5.

It is obvious that changes and modifications may be made in the manufacture of articles similar to that shown without departing from the invention or sacrificing any of its benefits. It is not essential to this invention that the fabric be in the form of blanks as it is fed into the device for cutting and piling it, nor is the form of knife essential but may be varied as desired.

I claim:

1. A method of manufacturing articles composed of strips of fabric and vulcanizable material, the fabric strips being disposed at right angles to the plane of the articles, the steps of assembling these strips and causing them to adhere by cutting into strips a fabric layer coated with a skim of rubber, and stacking the cut strips under pressure perpendicularly with respect to the original fabric layer.

2. A method of manufacturing shoe soles composed of strips of fabric and vulcanizable material, the fabric strips being disposed at right angles to the plane of the articles, the steps of assembling the strips and causing them to adhere by cutting a blank equal to all the fabric strips laid edge to edge, severing said blank into a plurality of strips, and stacking the several strips under pressure perpendicularly to the original blank.

3. A method of manufacturing articles composed of strips of fabric and vulcanizable material, the fabric strips being disposed at right angles to the plane of the articles, the steps of assembling these strips and causing them to adhere by cutting into strips a fabric layer coated with a skim of unvulcanized rubber, and stacking the cut strips under pressure in a confined channel perpendicularly with respect to the original fabric layer.

4. A method of manufacturing shoe soles composed of strips of fabric and vulcanizable material, the fabric strips being disposed at right angles to the plane of the articles, the steps of assembling the strips and causing them to adhere by cutting a blank equal to all the fabric strips laid edge to edge, severing said blank into a plurality of strips, and stacking the severed strips under pressure in a confined channel perpendicularly to the original blank.

5. A method of manufacturing articles comprising strips of fabric disposed at an angle to the plane of the article, the steps of cutting the strips from a layer of fabric coated with an adhesive material, and stacking the cut strips in a column at an angle to the original fabric layer.

6. A method of manufacturing articles comprising strips of fabric disposed at an angle to the plane of the article, the steps of cutting strips from a layer of the fabric coated with an adhesive substance, and stacking, under pressure, the cut strips in a column at an angle to the original fabric layer.

7. A method of manufacturing articles in which are embedded strips of fibrous material, the fibers whereof are at an angle to the plane of the article, comprising the steps of cutting the strips from a layer of the fibrous material which has been coated with an adhesive substance, and stacking the cut strips in a column, under pressure, at an angle to the original layer.

HARVEY F. MARANVILLE.